US009150774B2

(12) United States Patent
Reddy et al.

(10) Patent No.: US 9,150,774 B2
(45) Date of Patent: Oct. 6, 2015

(54) METHODS FOR CEMENTING IN A SUBTERRANEAN FORMATION USING A CEMENT COMPOSITION CONTAINING A SET RETARDER OF A POLYESTER

(75) Inventors: B. Raghava Reddy, Duncan, OK (US); Drew Gaugler, Duncan, OK (US); Russel Fitzgerald, Waurika, OK (US)

(73) Assignee: Halliburton Energy Sevices, Inc., Houston, TX (US)

( * ) Notice: Subject to any disclaimer, the term of this patent is extended or adjusted under 35 U.S.C. 154(b) by 388 days.

(21) Appl. No.: 13/207,647

(22) Filed: Aug. 11, 2011

(65) Prior Publication Data

US 2013/0041068 A1 Feb. 14, 2013

(51) Int. Cl.

*C09K 8/467* (2006.01)
*C04B 28/02* (2006.01)
*C04B 28/06* (2006.01)
*C04B 103/00* (2006.01)
*C04B 103/22* (2006.01)
*C04B 103/44* (2006.01)

(52) U.S. Cl.

CPC ................. *C09K 8/467* (2013.01); *C04B 28/02* (2013.01); *C04B 28/06* (2013.01); *C04B 2103/0073* (2013.01); *C04B 2103/22* (2013.01); *C04B 2103/44* (2013.01)

(58) Field of Classification Search

CPC ........................................................ C04B 28/02
USPC .......................................................... 523/130
See application file for complete search history.

(56) References Cited

U.S. PATENT DOCUMENTS 5,932,344 A * 8/1999 Ikemoto et al. ............... 428/343
6,143,069 A 11/2000 Brothers et al.
6,332,921 B1 12/2001 Brothers et al.
7,172,022 B2 2/2007 Reddy et al.
7,244,303 B2 * 7/2007 Chatterji et al. .............. 106/724
7,381,263 B2 * 6/2008 Roddy et al. .................. 106/692
7,863,224 B2 1/2011 Keys et al.
2004/0261993 A1 12/2004 Nguyen
2005/0205258 A1 * 9/2005 Reddy et al. .................. 166/292
2006/0169182 A1 * 8/2006 Todd et al. ..................... 106/802
2006/0169451 A1 * 8/2006 Savery et al. ............. 166/280.2
2006/0281836 A1 12/2006 Kerns et al.
2007/0089643 A1 * 4/2007 Roddy et al. .................. 106/692
2008/0182764 A1 7/2008 Xu et al.
2009/0032252 A1 2/2009 Boney et al.

FOREIGN PATENT DOCUMENTS

DE 1669707 A1 2/1972
WO WO 2008062332 A2 5/2008

OTHER PUBLICATIONS

Ramachandran, V. S., Paroli, R. M., Beaudoin, J. J., and Delgado, A. H., Handbook of Thermal Analysis of Construction Materials, "Chapter 9—Non-Portland Cement Binders and Concrete", 2002, Noyes Publications, p. 362.*
Ellis, B., and Smith, R., Polymers a Property Database, Second Edition, 2009, Taylor & Francis Group, p. 435-438.*
Chauvel-Lebret, D. J., Auroy, P., and Bonnaure-Mallet, M., "Chapter 13: Biocompatibility of Elastomers", Polymeric Biomaterials, Second Edition, edited by Dumitriu, S., 2002, Marcel Dekker, Inc.*
Grijpma et al., 1994, "(Co)polymers of L-lactide, 1 Synthesis, thermal properties and hydrolytic degradation", Macromolecular Chemistry and Physics, vol. 195, p. 1633-1647.*
Vainio et al., 1996, "Biodegradable Lactone Copolymers. I. Characterization and Mechanical Behavior of ϵ-Caprolactone and Lactide Copolymers", Journal of Applied Polymer Science, vol. 59, Issue 8, p. 1281-1288.*

* cited by examiner

*Primary Examiner* — Peter F Godenschwager
*Assistant Examiner* — David Karst
(74) *Attorney, Agent, or Firm* — McGuireWoods, LLP

(57) ABSTRACT

According to an embodiment, a cement composition for use in an oil or gas well, the cement composition comprises: cement; water; and a polymer, wherein the polymer: (i) comprises a monomer or monomers capable of forming a polyester; and (ii) is capable of providing a thickening time of at least 2 hours at a temperature of 400° F. (204.4° C.) and a pressure of greater than about 500 psi (3.4 MPa) for a test composition consisting essentially of: the cement; the water; and the polymer, and in the same proportions as in the cement composition. According to another embodiment, a method of cementing in a subterranean formation comprises: introducing the cement composition into the subterranean formation; and allowing the cement composition to set.

17 Claims, No Drawings

METHODS FOR CEMENTING IN A SUBTERRANEAN FORMATION USING A CEMENT COMPOSITION CONTAINING A SET RETARDER OF A POLYESTER

TECHNICAL FIELD

A cement composition and methods of cementing in a subterranean formation are provided. The cement compositions include a set retarder of a polyester. In an embodiment, the cement composition includes calcium aluminate cement. In another embodiment, the subterranean formation is a high-temperature well, or a sour gas or acid gas well.

SUMMARY

According to an embodiment, a method of cementing in a subterranean formation comprises: introducing a cement composition into the subterranean formation, wherein the cement composition comprises: cement; water; and a polymer, wherein the polymer: (i) comprises a monomer or monomers capable of forming a polyester; and (ii) is capable of providing a thickening time of at least 2 hours at a temperature of 400° F. (204.4° C.) and a pressure of greater than about 500 psi (3.4 MPa) for a test composition consisting essentially of: the cement; the water; and the polymer, and in the same proportions as in the cement composition; and allowing the cement composition to set.

According to another embodiment, a cement composition for use in an oil or gas well, the cement composition comprises: cement; water; and a polymer, wherein the polymer: (i) comprises a monomer or monomers capable of forming a polyester; and (ii) is capable of providing a thickening time of at least 2 hours at a temperature of 400° F. (204.4° C.) and a pressure of greater than about 500 psi (3.4 MPa) for a test composition consisting essentially of: the cement; the water; and the polymer, and in the same proportions as in the cement composition.

DETAILED DESCRIPTION OF THE INVENTION

As used herein, the words "comprise," "have," "include," and all grammatical variations thereof are each intended to have an open, non-limiting meaning that does not exclude additional elements or steps.

It should also be understood that, as used herein, "first," "second," and "third," are assigned arbitrarily and are merely intended to differentiate between two or more monomers, fluids, etc., as the case may be, and does not indicate any sequence. Furthermore, it is to be understood that the mere use of the word "first" does not require that there be any "second," and the mere use of the word "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase.

As used herein, a "cement composition" is a mixture of at least cement and water. A cement composition can include additives. As used herein, the term "cement" means an initially dry substance that develops compressive strength or sets in the presence of water. An example of cement is Portland cement. A cement composition is generally a slurry in which the water is the continuous phase of the slurry and the cement (and any other insoluble particles) is the dispersed phase. The continuous phase of a cement composition can include dissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas or water producing well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing.

During cementing operations, it is necessary for the cement composition to remain pumpable during introduction into the well and until the composition is situated in the portion of the well to be cemented. After the cement composition has reached the portion of the well to be cemented, the cement composition ultimately sets. As used herein, the term "set" and all grammatical variations thereof means the process of becoming hard or solid through curing. A cement composition that thickens too quickly while being pumped can damage pumping equipment or block tubing or pipes, and a cement composition that sets too slowly can cost time and money while waiting for the composition to set.

Often times, a wellbore fluid, such as a cement composition, is modified for use in challenging wellbores. Examples of challenging wellbores include, but are not limited to, high temperature and/or high pressure wells, wells containing high amounts of an acid gas, such as carbon dioxide gas (acid gas wells), steam injection wells, steam production wells, geothermal wells, and wells containing high amounts of a sour gas, such as hydrogen sulfide gas (sour gas wells). For example, at high static subterranean temperatures, and in the presence of brines containing carbon dioxide, conventional cement compositions containing hydraulic cements (e.g., Portland cement), particularly those which exhibit high pH (i.e., greater than 11), rapidly deteriorate due to carbonation of alkaline components of the set cement such as calcium hydroxide. Thus, the use of conventional hydraulic cement compositions, for example Portland cement, in these types of environments may result in the loss of wellbore integrity. An alternative to using conventional hydraulic cements in challenging wellbores is the use of a calcium aluminate based cement (CABC). CABC has a higher temperature resistance compared to Portland cement/silica mixtures, which can lead to a longer term integrity of the cement sheath. The use of CABC offers other advantages as it provides resistance to sulfates, corrosion, and sour gas. Calcium Aluminate Cements (CACs), when combined with a soluble phosphate salt (e.g., sodium metaphosphate) and a pozzolanic material (e.g., Class F fly ash), form cement compositions that upon setting, can exhibit improved physical and mechanical properties. Some of the improved properties include, binding to the subterranean formation and/or casing and to itself, a higher compressive strength, carbonation and corrosion resistance, and low permeability.

A variety of CACs are commercially available with varying alumina contents. While attractive from an economic standpoint, one drawback to the use of CACs is their unpredictable thickening times even when set retarders such as citric acid are used, especially at elevated temperatures, for example at temperatures greater than 200° F. (93.3° C.). As such, the unpredictable thickening times of CAC slurries make well cementing with these types of cement a challenge. A need therefore exists for materials that can retard the CAC slurries so that the CAC slurry may display predictable thickening times and remain pumpable before and during placement into the desired wellbore location.

It is to be understood that if any test (e.g., thickening time) requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the cement composition as it is being pumped downhole. After the cement composition is ramped up to the specified temperature and possibly specified pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured according to API Recommended Practice 10-B2, First Edition, July 2005 as follows. The cement composition is first mixed according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). The cement composition is then placed in the test cell of a High-Temperature, High-Pressure (HTHP) consistometer, such as a FANN® Model 275 or a Chandler Model 8240. Consistency measurements are taken continuously until the cement composition exceeds 70 Bc.

A set retarder can be added to a cement composition to help increase the thickening time of the cement composition such that the cement composition remains pumpable for a desired time at a specific temperature. The thickening time is proportional to the setting time, i.e., the longer the thickening time, the longer the setting time will be. Therefore, a set retarder can be added to a cement composition to help increase the setting time of the cement composition. However, if a set retarder is in too-high a concentration, the cement composition may remain in a fluid state for an undesirably long period of time, often referred to as the Waiting-on-Cement (WOC) time, during which no further operations can be performed on the wellbore. Therefore, the set retarder also can be used in a concentration such that the cement composition sets in a desired time.

Conventional set retarders used to delay conventional cements, for example Portland cements, have been used to delay the setting time of cement compositions. Examples of conventional set retarders used to delay setting of Portland cements are disclosed in U.S. Pat. No. 7,004,256 issued Feb. 28, 2006 to Chatterji et al., which is incorporated by reference in its entirety. Another example of a conventional set retarder for Portland cement is a copolymer formed from a monomer of 2-acrylamido-2-methylpropane sulfonic acid ("AMPS"). Examples of set retarders for calcium aluminate cements are disclosed in U.S. Pat. No. 7,863,224, issued Jan. 4, 2011 to Crystal Lynne Keys et al., and US Patent Application 2008/0182764, having as named inventors Ying Xu, B. R. Reddy, Rickey Morgan, and Lance Brothers, filed on Jan. 30, 2007.

A polymer is a large molecule composed of repeating units, typically connected by covalent chemical bonds. The number of repeating units of a polymer can range from approximately 11 to greater than 10,000. The number of repeating units of a polymer is referred to as the chain length of the polymer. A polymer is formed from the polymerization reaction of monomers. A polymer formed from one type of monomer is called a homopolymer. A copolymer is formed from two or more different types of monomers. In the polymerization reaction, the monomers are transformed into the repeating units of a polymer. In a copolymer, the repeating units for each of the monomers can be arranged in various ways along the polymer chain. For example, the repeating units can be random, alternating, periodic, or block. The conditions of the polymerization reaction can be adjusted to help control the average number of repeating units (the average chain length) of the polymer. Monomers can be polymerized using a variety of methods, and depending on the mechanism of polymerization, the polymerization process may be referred to as addition polymerization or condensation polymerization. Addition polymerization is when the molecules of one type of monomer or different types of monomers are simply added together to form a polymer. The monomers commonly used for addition polymerization are unsaturated compounds such as alkenes, alkadienes, acrylates, acrylamides and their derivatives. This method of polymerization can take place through formation of either radicals or ionic species such as carboanions and carbocations. Condensation polymerization is a process by which two monomer molecules join together, resulting in the loss of small molecules which is often water or an alcohol. The type of end product resulting from a condensation polymerization reaction is dependent on the number of functional end groups of the monomer which can react.

A polymer has an average molecular weight, which is directly related to the average chain length of the polymer. The average molecular weight of a polymer has an impact on some of the physical characteristics of a polymer, for example, its solubility in water, its viscosity, and its biodegradability. For a copolymer, each of the monomers will be repeated a certain number of times (number of repeating units). The average molecular weight for a copolymer can be expressed as follows:

$$\text{Avg. molecular weight}=(M.W.m_1{*}RU\ m_1)+(M.W.m_2{*}RU\ m_2)$$

where $M.W.m_1$ is the molecular weight of the first monomer; RU $m_1$ is the number of repeating units of the first monomer; $M.W.m_2$ is the molecular weight of the second monomer; and RU $m_2$ is the number of repeating units of the second monomer. Of course, a terpolymer would include three monomers, a tetra polymer would include four monomers, and so on.

A polyester and a polyamide are examples of polymers formed using condensation polymerization. Polyesters are formed using monomer(s) containing alcohol and carboxylic acid or ester functional groups, and polyamides are formed from monomer(s) containing amine and carboxylic acid or ester functional groups. A representative scheme is shown below for the preparation of polyesters or polyamides.

$$\text{Polyester-}(H_nX)_a\text{—R—}(COOY)_b\rightarrow\text{—}[X_a\text{—R—}(CO)_b]_m\text{—}+HOY$$

$$\text{Polyamide-}(H_nX)_c\text{—R+R'—}(COOY)_d\rightarrow\text{—}[X\text{—R—}X\text{—}((O)C_y\text{—R'—}(CO)]_m\text{—}+HOY$$

where R and R' are alkylene groups containing either aliphatic compounds, aromatic compounds, or both, aliphatic and aromatic compounds; X is oxygen (O), sulphur (S), or an amine ($NH_2$); Y is hydrogen (H) or an alkyl or aryl group; a and b are numbers of 1 or higher; c and d are numbers of 2 or higher; m is a number of 10 or higher; and n is a number of 1 to 2.

Once formed, a polymer can undergo degradation. Polymer degradation refers to changes in at least some of the properties of the polymer, such as the tensile strength, color, shape, etc. by the influence of one or more environmental factors, such as heat, light or chemicals due to changes in the molecular weights and/or chemical structure of the polymer. Examples of chemicals that can cause polymer degradation include oxygen, acids, alkalis, water, and some salts. The rate at which a polymer degrades can vary. Some of the factors that can affect the rate of polymer degradation include temperature and the presence or absence of a catalyst (e.g., an acid or a base). For example, the higher the temperature, the faster the rate of polymer degradation. Moreover, for a given temperature, the addition of a suitable catalyst may increase the degradation rate. One example of a mechanism by which a polymer can be degraded is hydrolysis. Hydrolysis is a type of decomposition chemical reaction between water and another compound such that the new products contain a proton and a hydroxide ion from water combined with the anionic (or basic) and cationic (or acidic) portions of the compound respectively as shown below:

$$AB+H_2O\rightarrow AH+BOH$$

When AB in the above equation is an organic ester, the products of ester hydrolysis are an alcohol and a carboxylic acid, as shown below:

$$RCO\text{—}OR'+H_2O\rightarrow RCO\text{—}OH+R'\text{—}OH$$

When the organic ester is a polyester with ester functional groups in the polymer backbone, ester hydrolysis results in the formation of smaller polymeric or oligomeric fragments with hydroxyl and carboxylic acid chain end groups. If the hydrolysis of a polyester is to go to completion, then the ultimate products will be monomers containing the hydroxyl and carboxylic acid functional groups. Because of their increased polarity due to higher polar chain ends and/or higher polymer or oligomer chain lengths, smaller polymeric or oilgomeric fragments have increased water solubility when compared to the original polymer solubility, and the fragments are also available for reactions with suitable compounds present in the aqueous medium. For example, under suitable conditions, polylactic acid (PLA) produces hydrolysis degradation products of oligomers, and ultimately lactic acid.

A polymer can have a particular shape. Common polymer shapes include spherical, rod-like, disc-like, rhomboid, angular, and irregular. However, after degradation, the degradation products will often times have a distinct shape that is different from the pre-degraded polymer. Upon complete degradation to monomeric levels, the resulting compounds may completely dissolve in the medium or may form insoluble products due to possible reactions with metal ions present in the medium.

It has been discovered that aliphatic polyesters can be used as a set retarder in calcium aluminate cement (CAC) compositions. The polymer can be used as a set retarder in challenging wellbores, such as high-temperature wells, or sour gas or acid gas wells. As used herein, a high-temperature well is a well with a bottomhole temperature of at least 300° F. (148.9° C.). As used herein, the bottomhole temperature refers to the downhole temperature, often referred to as Bottom Hole Circulating Temperature (BHCT), at the portion of the well to be cemented. The polymer can also be used in wellbores having a bottomhole temperature greater than or equal to the glass transition temperature (Tg) or melting point temperature (Tm) of the polymer. Accordingly, the polymer can undergo degradation, thereby causing an increase in the thickening time and an increase in the setting time of the cement composition. It is believed that a CAC composition will not set so long as the pH of the composition is in the acidic range. Without being limited by theory, it is believed that the degradation products either maintain or reduce the pH of the CAC composition within an acidic or weakly basic range (for example, less than a pH of 11). Thus, the polymer functions as a set retarder.

Because it is believed that the degradation of the polymer into set retarding active fragments is necessary for cement retardation at the wellbore temperatures, when the cement composition ultimately sets, the shape or dimensions of the residual polymer particles are expected to be different than the original polymer shape or dimensions. Polyesters have been used to create voids in a set cement composition. One example can be found in U.S. Pat. No. 7,172,022, issued on Feb. 6, 2007 to B. Raghava Reddy, et al. In order to create voids in a set cement composition, the degradable polymer does not undergo a degradation reaction until after the cement composition has set. In this instance, the polymer is introduced into a wellbore that has a bottomhole temperature of at least less than the Tm or Tg of the polymer. However, the purpose of the present invention is to employ the degradation products of the polymer to retard the setting of the cement composition by using the polymer in environments with suitably high temperatures (e.g., at or above which the polymer degrades) to keep the cement composition in slurry form. In other words, the polyester polymer used in this invention is consumed by degradation, either partially or completely, before the cement sets, and retention of the original polymer particle shape is not an objective of the present invention. Therefore, unlike the '022 patent, in the present invention, when all of the polymer is consumed by the time the cement composition sets, there may not be any residual un-degraded polymer in the set cement composition that can undergo degradation, thus creating voids in the set cement.

According to an embodiment, a method of cementing in a subterranean formation comprises: introducing a cement composition into the subterranean formation, wherein the cement composition comprises: cement; water; and a polymer, wherein the polymer: (i) comprises a monomer or monomers capable of forming a polyester; and (ii) is capable of providing a thickening time of at least 2 hours at a temperature of 400° F. (204.4° C.) and a pressure of greater than about 500 psi (3.4 MPa) for a test composition consisting essentially of: the cement; the water; and the polymer, and in the same proportions as in the cement composition; and allowing the cement composition to set.

According to another embodiment, a cement composition for use in an oil or gas well, the cement composition comprises: cement; water; and a polymer, wherein the polymer: (i) comprises a monomer or monomers capable of forming a polyester; and (ii) is capable of providing a thickening time of at least 2 hours at a temperature of 400° F. (204.4° C.) and a pressure of greater than about 500 psi (3.4 MPa) for a test composition consisting essentially of: the cement; the water; and the polymer, and in the same proportions as in the cement composition.

It is to be understood that the discussion of preferred embodiments regarding the cement composition or any ingredient in the cement composition, is intended to apply to the composition embodiments and the method embodiments. Any reference to the unit "gallons" means U.S. gallons.

The cement composition includes cement. The cement can be a calcium aluminate cement (CAC). The CAC comprises at least calcium, aluminum, and oxygen. According to an embodiment, the CAC comprises aluminum oxide ($Al_2O_3$) and calcium oxide (CaO). The aluminum oxide can be present in the CAC in an amount in the range of about 30 weight (wt.) % to about 80 wt. %, alternatively from about 40 wt. % to about 70 wt. %, or alternatively from about 50 wt. % to about 60 wt. %, based upon the total weight of the CAC. The calcium oxide can be present in the CAC in an amount in the range of about 20 wt. % to about 60 wt. %, alternatively from about 30 wt. % to about 50 wt. %, or alternatively from about 35 wt. % to about 40 wt. %, based upon the total weight of the CAC. Additionally, the aluminum oxide to calcium oxide ($Al_2O_3$/CaO) weight ratio in the CAC may vary from about 1:1 to about 4:1, alternatively from about 2:1 to about 1.5:1. An example of a commercially-available calcium aluminate-based cement is ThermaLock™, marketed by Halliburton Energy Services.

The cement composition includes water. The water can be selected from the group consisting of freshwater, brackish water, and saltwater, in any combination thereof in any proportion. The cement composition can also include a salt. Preferably, the salt is selected from sodium chloride, calcium chloride, calcium bromide, potassium chloride, potassium bromide, magnesium chloride, and any combination thereof in any proportion. Preferably, the salt is in a concentration in the range of about 0.1% to about 40% by weight of the water.

According to an embodiment, the cement composition has a density of at least 9 pounds per gallon (ppg). The cement composition can have a density in the range of about 9 to about 22 ppg.

The cement composition includes a polymer, wherein the polymer: (i) comprises a monomer or monomers capable of forming a polyester; and (ii) is capable of providing a thickening time of at least 2 hours at a temperature of 400° F. (204.4° C.) and a pressure of greater than about 500 psi (3.4 MPa) for a test composition consisting essentially of: the cement; the water; and the polymer, and in the same proportions as in the cement composition. According to an embodiment, the polymer is a thermoplastic aliphatic polyester. According to this embodiment, the polymer includes at least 10 ester functional groups. The polymer can have an average molecular weight in the range of about 400 to about 300,000, alternatively about 400 to about 5,000, or alternatively about 400 to about 1,500. In alternative embodiments, the polyester may be a non-crystalline (amorphous) or a semi-crystalline polymer. As used herein the crystallinity of a substance is indicated by a melting point and/or by X-ray absorption peaks. A glass transition temperature (Tg) is indicative of the amorphous nature or presence of an amorphous region of a polymer. The rate of degradation and hence, the polymer's effectiveness to retard the calcium aluminate cement composition is also partially dependent on the crystallinity of the polyester. Depending on the polymer composition, physical properties, crystallinity, molecular weight, and rate of degradation, polyesters of suitable characteristics can be chosen to achieve desired cement retardation at desired wellbore temperatures by suitable experimentation.

The polymer comprises a monomer or monomers capable of forming a polyester. The polymer can include ten or more ester functional groups. According to an embodiment, the polymer is a homopolymer. The homopolymer is formed from one type of monomer. In order to be capable of forming a polyester homopolymer, the one type of monomer can comprise at least one alcohol functional group and at least one carboxylic acid functional group. The one type of monomer can also include two or more alcohol functional groups, two or more carboxylic acid functional groups, or both, two or more alcohol and two or more carboxylic acid functional groups. The monomer for the homopolymer can be selected from the group consisting of lactic acid, lactide, glycolic acid, caprolactone hydroxybutanioc acid, and hydroxybenzoic acid.

According to another embodiment, the polymer is a copolymer. The copolymer is formed from at least a first monomer and a second monomer. In order to be capable of forming a polyester, the first monomer can comprise at least one alcohol functional group and the second monomer can comprise at least one carboxylic acid functional group. The first monomer can include two or more alcohol functional groups. The second monomer can include two or more carboxylic acid functional groups. The first monomer can be selected from the group consisting of ethylene glycol, propylene glycol, butanediol, pentaerythritol and butane diol. The second monomer can be selected from the group consisting of phthalic acid (ortho- meta- or para-), citric acid, malic acid, and naphthalene dicarboxylic acid. An example of a suitable polyester is polylactic acid (PLA) or polyglycolic acid (PGA).

The polymer is capable of providing a thickening time of at least 2 hours at a temperature of 400° F. (204.4° C.) and a pressure of greater than about 500 psi (3.4 MPa) for a test composition consisting essentially of: the cement; the water; and the polymer, and in the same proportions as in the cement composition. According to an embodiment, the polymer is in at least a sufficient concentration such that the cement composition has a thickening time of at least 1 hour at a temperature of 400° F. (204.4° C.) and a pressure of greater than about 500 psi (3.4 MPa). The polymer can also be in at least a sufficient concentration such that the cement composition has a thickening time in the range of about 2 to about 7 hours at a temperature of 400° F. (204.4° C.) and a pressure of greater than about 500 psi (3.4 MPa). According to another embodiment, the polymer is in at least a sufficient concentration such that the cement composition has a thickening time of at least 1 hour at a temperature of 450° F. (232.2° C.) and a pressure of greater than about 500 psi (3.4 MPa). The polymer can also be in at least a sufficient concentration such that the cement composition has a thickening time in the range of about 2 to about 7 hours at a temperature of 450° F. (232.2° C.) and a pressure of greater than about 500 psi (3.4 MPa). According to yet another embodiment, the polymer is in at least a sufficient concentration such that the cement composition has a thickening time of at least 1 hour at a temperature of 500° F. (260.0° C.) and a pressure of greater than about 500 psi (3.4 MPa). The polymer can also be in at least a sufficient concentration such that the cement composition has a thickening time in the range of about 1 to about 5 hours at a temperature of 500° F. (260.0° C.) and a pressure of greater than about 500 psi (3.4 MPa). According to another embodiment, the polymer is in at least a sufficient concentration such that the cement composition has a thickening time of at least 1 hour at the bottomhole temperature and pressure of the well. The polymer can be in at least a sufficient concentration such that the cement composition has a thickening time in the range of about 1 to about 7 hours, alternatively of about 2 to about 5 hours, at the bottomhole temperature and pressure of the well. One of skill in the art will be able to determine the concentration of the polymer needed in order to achieve the desired thickening time, for example, based on the bottom-hole temperature of the well, and other specific conditions of the well, such as if the well contains a sour gas or an acid gas.

According to an embodiment, the polymer is in a concentration equal to or less than a sufficient concentration such that the cement composition has a setting time of less than 48, preferably less than 24, hours at a temperature of 400° F. (204.4° C.). According to another embodiment, the polymer is in a concentration equal to or less than a sufficient concentration such that the cement composition has a setting time of less than 48, preferably less than 24, hours at the bottomhole temperature of the well.

The polymer can be in a concentration of at least 0.05% by weight of the cement (bwoc). The polymer can be in a concentration in the range of about 0.05% to about 10% bwoc. The polymer can be in a concentration in the range of about 1% to about 5% bwoc.

According to an embodiment, the polymer is capable of degrading. The polymer can degrade at a temperature greater than or equal to its glass transition temperature (Tg). The polymer can also degrade at a temperature greater than or equal to its melting point temperature (Tm). The polymer can degrade via hydrolysis. In an embodiment, the polymer molecular weight degrades at a rate of 5 to 30% per hour at a specified temperature. According to another embodiment, the cement composition further includes a degradation catalyst. The degradation catalyst can be used to help initiate or increase the degradation rate of the polymer. The degradation catalyst can be an acid or a base. The degradation catalyst can be selected such that is capable of initiating the degradation of the polymer or capable of increasing the degradation rate of the polymer. One of skill in the art will be able to select the degradation catalyst and the concentration of the degradation catalyst needed based on the exact polymer used. The use of a degradation catalyst may be useful in situations in which the bottomhole temperature of the subterranean formation is less than the Tg or Tm of the polymer.

Preferably, the polymer has complete degradation in a specified period of time. It is believed that the complete degradation of the polymer allows the cement composition to begin setting. In an embodiment, the specified period of time is the time it takes for the cement composition to be introduced into and situated in the portion of the subterranean formation to be cemented. In another embodiment, the specified period of time is at least 30 minutes longer than the time it takes for the cement composition to be introduced into and situated in the portion of the subterranean formation to be cemented. In yet another embodiment, the specified period of time is a time in the range of about 30 minutes to about 2 hours longer than the time it takes for the cement composition to be introduced into and situated in the portion of the subterranean formation to be cemented.

The cement composition can be used in a variety of wells. Examples of wells the cement composition can be used in include, without limitation, high-temperature and/or high-pressure wells, geothermal wells, sour gas wells, and acid gas wells. The subterranean formation can have a bottomhole temperature of at least 300° F. (148.9° C.). The subterranean formation can have a bottomhole temperature in the range of about 300° F. to about 600° F. (about 148.9° C. to about 315.6° C.). According to an embodiment, the subterranean formation has a bottomhole temperature greater than or equal to the glass transition temperature of the polymer. In another embodiment, the subterranean formation has a bottomhole temperature greater than or equal to the melting point temperature of the polymer.

The cement composition can further include a second set retarder. The second set retarder can be a low-temperature set retarder. A low-temperature set retarder is a compound, including polymers, that is capable of delaying the setting of a cement composition at temperatures below 300° F. (148.9° C.). The second set retarder can be selected from the group consisting of citric acid, glucanolactone, boric acid, tartaric acid, sodium pentaborate, and combinations thereof. The second set retarder can be in a concentration of at least 0.05% bwoc. The second set retarder can be in a concentration in the range of about 0.05% to about 5% bwoc.

The cement composition can further include other additives. Examples of other additives include, but are not limited to, a filler, a fluid loss additive, a friction reducer, a strength-retrogression additive, a light-weight additive, a defoaming agent, a high-density additive, a mechanical property enhancing additive, a lost-circulation material, a filtration-control additive, a thixotropic additive, and combinations thereof.

The cement composition can include a filler. Suitable examples of fillers include, but are not limited to, fly ash, sand, clays, and vitrified shale. Preferably, the filler is in a concentration in the range of about 5% to about 50% by weight of the cement (bwoc).

The cement composition can include a fluid loss additive. The fluid loss additive can be a cationic starch as described in U.S. Pat. No. 6,846,357, issued on Jan. 25, 2005 to Reddy et al., and U.S. Pat. No. 6,796,378, issued on Sep. 28, 2004 to Reddy et al., or polymers capable of viscosifying an aqueous acid as described in a pending U.S. patent application Ser. No. 12/961,234, filed on Dec. 6, 2010 and having for named inventors Trissa Joseph et al., each of which is incorporated by reference herein in its entirety. Preferably, the fluid loss additive is in a concentration in the range of about 0.05% to about 10% bwoc.

The cement composition can include a friction reducer. Suitable examples of commercially-available friction reducers include, but are not limited to, CFR-2™, CFR-3™, CFR-5LE™, CFR-6™, and CFR-8™, marketed by Halliburton Energy Services, Inc. Preferably, the friction reducer is in a concentration in the range of about 0.1% to about 10% bwoc.

The cement composition can include a strength-retrogression additive. Suitable examples of commercially-available strength-retrogression additives include, but are not limited to, SSA-1™ and SSA-2™, marketed by Halliburton Energy Services, Inc. Preferably, the strength-retrogression additive is in a concentration in the range of about 5% to about 50% bwoc.

Commercially-available examples of other additives include, but are not limited to, and are marketed by Halliburton Energy Services, Inc. under the tradenames High Dense® No. 3, High Dense® No. 4, Baritemi, Micromax™, Silicalitem, WellLife® 665, WellLife® 809, WellLife® 810, and Channel Seal™ Fluid.

The method embodiments include the step of introducing the cement composition into the subterranean formation. The step of introducing can be for the purpose of at least one of the following: well completion; foam cementing; primary or secondary cementing operations; well-plugging; squeeze cementing; and gravel packing. The cement composition can be in a pumpable state before and during introduction into the subterranean formation. In an embodiment, the subterranean formation is penetrated by a well. The well can be, without limitation, an oil, gas, water, or injection well. According to this embodiment, the step of introducing includes introducing the cement composition into the well. According to another embodiment, the subterranean formation is penetrated by a well and the well includes an annulus. According to this other embodiment, the step of introducing includes introducing the cement composition into a portion of the annulus.

The method embodiments also include the step of allowing the cement composition to set. The step of allowing can be after the step of introducing the cement composition into the subterranean formation. The method embodiments can include the additional steps of perforating, fracturing, or performing an acidizing treatment, after the step of allowing.

EXAMPLES

To facilitate a better understanding of the present invention, the following examples of certain aspects of preferred embodiments are given. The following examples are not the only examples that could be given according to the present invention and are not intended to limit the scope of the invention.

Unless otherwise stated, each of the cement compositions had a density of 15.0 pounds per gallon (ppg) (1.797 kilograms per liter "k/L") and contained at least the following ingredients: tap water (at a concentration of 37.6% bwoc); ThermaLock™ cement comprising calcium aluminate; Class F fly ash and sodium hexametaphosphate for cement compositions #11, 13, and 16. The remaining compositions are identical except that the Class F flyash used was from a different vendor (Flyash Direct, Avon Lake, Ohio). The cement compositions also included, in varying concentrations as % bwoc: an aliphatic polyester set retarder of either polylactic acid (PLA) or polyglycolic acid (PGA); and/or a second set retarder of citric acid and/or glucanolactone; and in composition #19, calcium chloride ($CaCl_2$) salt as a second set retarder. The PLA used in compositions #12, 13, 15, 16 and 17 was a semicrystalline polymer, with a particle size of 80 mesh; the PLA used in Composition #18 was an amorphous polymer; and the PLA used in the other compositions was a semicrystalline polymer with a particle size of 45 mesh. The PGA used in the compositions was a fine powder having a 325 mesh size, a molecular weight of 164,000, a melting point of 221° C., and degradation rates of 5,000 M.W./hr at 176° F. (80° C.) and of 1,800 M.W./hr at 140° F. (60° C.).

Unless stated otherwise, all of the cement compositions were mixed and tested according to the procedure for the specific test as described in The Detailed Description section above. The thickening time tests were conducted at a variety of temperatures and a pressure of 8,000 psi (55.2 MPa).

Table 1 contains thickening time data for the cement compositions at various temperatures. As can be seen in Table 1, PLA and PGA are effective as a set retarder at temperatures of 400° F. (204.4° C.), 450° F. (232.2° C.), and 500° F. (260.0° C.). Compositions #1 and 2 illustrate that PLA and PGA provide a sufficient thickening time at 400° F. to allow use of the composition for cementing wells at that temperature. A control slurry of the same density cement composition without any set retarder sets in about 1.5 hrs at a temperature of 140° F. (60° C.). The thickening time can be increased when a second set retarder is used in conjunction with either PLA or PGA. Moreover, as can be seen in composition #19, PLA is compatible with a cement composition containing $CaCl_2$ salt. The thickening time of a cement composition can be adjusted by varying the concentrations of PLA or PGA and/or citric acid or glucanolactone.

TABLE 1

| | Citric Acid Conc. | Glucanolactone Conc. | $CaCl_2$ Conc. | PLA Conc. | PGA Conc. | Temperature (° F.) | Thickening Time (hr:min) |
|---|---|---|---|---|---|---|---|
| 1 | — | — | — | 2 | — | 400 | 1:45 |
| 2 | — | — | — | — | 2 | 400 | 1:45 |
| 3 | 1 | — | — | 2 | — | 400 | 5:10 |
| 4 | 1 | — | — | 1 | — | 400 | 3:25 |

TABLE 1-continued

| | Citric Acid Conc. | Glucanolactone Conc. | $CaCl_2$ Conc. | PLA Conc. | PGA Conc. | Temperature (° F.) | Thickening Time (hr:min) |
|---|---|---|---|---|---|---|---|
| 5 | 0.5 | — | — | 1 | — | 400 | 3:10 |
| 6 | — | 1 | — | 1 | — | 400 | 1:45 |
| 7 | — | 1 | — | 0.5 | — | 400 | 1:50 |
| 8 | 1 | — | — | 2 | — | 450 | 2:05 |
| 9 | 1.5 | — | — | 2 | — | 450 | 2:20 |
| 10 | 3 | — | — | 2 | — | 450 | 1:45 |
| 11 | 3 | — | — | 2 | — | 450 | 4:45 |
| 12 | 3 | — | — | 2 | — | 500 | 1:00 |
| 13 | — | 3 | — | 2 | — | 500 | 1:00 |
| 14 | 2 | 5 | — | — | — | 500 | 1:45 |
| 15 | 3 | — | — | 2 | — | 500 | 1:00 |
| 16 | — | 3 | — | 2 | — | 500 | 1:00 |
| 17 | 2 | 2 | — | — | — | 500 | 1:45 |
| 18 | 1 | 2 | — | — | 2 | 500 | 2:20 |
| 19 | 3 | — | 0.5 | 2 | — | 500 | 3:25 |
| 20 | 2 | 4 | — | — | — | 500 | 1:30 |
| 21 | 1.5 | 3 | — | — | — | 500 | 1:15 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:

introducing a cement composition into the subterranean formation, wherein the cement composition comprises:

cement;

water; and a polymer, wherein the polymer:

(i) is capable of providing a thickening time of at least 2 hours at a temperature of 400° F. (204.4° C.) and a pressure of greater than about 500 psi (3.4 MPa) for a test composition consisting essentially of: the cement; the water; and the polymer, and in the same proportions as in the cement composition;

(ii) increases the setting time of the cement composition due to degradation of the polymer; and (iii) is polylactic acid or polyglycolic acid, wherein the subterranean formation has a bottomhole temperature greater than or equal to the glass transition temperature and/or the melting point temperature of the polymer; and allowing the cement composition to set, wherein the polymer does not create voids in the set cement composition.

2. The method according to claim 1, wherein the water is selected from the group consisting of freshwater, brackish water, and saltwater, in any combination thereof in any proportion.

3. The method according to claim 1, wherein the polymer is in at least a sufficient concentration such that the cement composition has a thickening time in the range of about 2 to about 7 hours at a temperature of 400° F. (204.4° C.) and a pressure of greater than about 500 psi (3.4 MPa).

4. The method according to claim 1, wherein the polymer is in a concentration equal to or less than a sufficient concentration such that the cement composition has a setting time of less than 48 hours at a temperature of 400° F. (204.4° C.).

5. The method according to claim 1, wherein the polymer is in a concentration in the range of about 1% to about 5% by weight of the cement.

6. The method according to claim 1, wherein the cement composition further includes a degradation catalyst.

7. The method according to claim 1, wherein the polymer undergoes complete degradation in a specified period of time.

8. The method according to claim 7, wherein the specified period of time is the time it takes for the cement composition to be introduced into and situated in the portion of the subterranean formation to be cemented.

9. The method according to claim 1, wherein the cement composition further includes a second set retarder.

10. The method according to claim 9, wherein the second set retarder is selected from the group consisting of citric acid, glucanolactone, boric acid, tartaric acid, sodium pentaborate, and combinations thereof.

11. The method according to claim 1, wherein the cement composition further includes a salt.

12. The method according to claim 1, wherein the subterranean formation is penetrated by a well.

13. The method according to claim 12, wherein the polymer is in at least a sufficient concentration such that the cement composition has a thickening time in the range of about 1 to about 7 hours at the bottomhole temperature and pressure of the well.

14. The method according to claim 12, wherein the well is a high-temperature well, a high-pressure well, a geothermal well, a sour gas well, or an acid gas well.

15. The method according to claim 1, wherein the cement is a calcium aluminate cement.

16. The method according to claim 1, wherein the polymer partially or completely degrades before the cement sets.

17. The method according to claim 1, wherein the polymer degrades and decreases in molecular weight at a rate of 5% to 30% per hour at a temperature greater than or equal to the glass transition temperature and/or the melting point temperature of the polymer.

* * * * *